United States Patent
Jeong

(10) Patent No.: US 11,542,821 B2
(45) Date of Patent: Jan. 3, 2023

(54) ROTOR AND TURBO MACHINE INCLUDING SAME

(71) Applicant: DOOSAN ENERBILITY CO., LTD., Changwon (KR)

(72) Inventor: Yoo Seok Jeong, Seoul (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 17/376,244

(22) Filed: Jul. 15, 2021

(65) Prior Publication Data

US 2022/0074311 A1  Mar. 10, 2022

(30) Foreign Application Priority Data

Sep. 8, 2020 (KR) .................. 10-2020-0114789

(51) Int. Cl.
*F01D 5/30* (2006.01)
*F01D 5/18* (2006.01)
*F01D 5/32* (2006.01)

(52) U.S. Cl.
CPC .............. *F01D 5/18* (2013.01); *F01D 5/30* (2013.01); *F01D 5/3007* (2013.01); *F01D 5/3092* (2013.01); *F01D 5/323* (2013.01); *F05D 2220/32* (2013.01); *F05D 2260/20* (2013.01)

(58) Field of Classification Search
CPC ............ F01D 5/18; F01D 5/30; F01D 5/3007; F01D 5/3092; F01D 5/323; F05D 2220/32; F05D 2260/20
See application file for complete search history.

(56) References Cited

U.S. PATENT DOCUMENTS

| | | | | |
|---|---|---|---|---|
| 2,317,338 A | * | 4/1943 | Rydmark | F01D 5/3007 416/221 |
| 2,753,149 A | * | 7/1956 | Kurti | F01D 5/323 416/216 |
| 2,847,187 A | * | 8/1958 | Murphy | F01D 5/323 29/451 |
| 3,313,519 A | * | 4/1967 | Jenson | F01D 5/30 416/221 |
| 3,986,779 A | * | 10/1976 | Beckershoff | F01D 5/326 416/221 |
| 4,022,545 A | * | 5/1977 | Shank | F01D 5/3007 416/135 |
| 4,208,170 A | * | 6/1980 | Tucker | F01D 5/323 416/221 |

(Continued)

FOREIGN PATENT DOCUMENTS

KR   1020190047973 A   5/2019

*Primary Examiner* — Igor Kershteyn
*Assistant Examiner* — Theodore C Ribadeneyra
(74) *Attorney, Agent, or Firm* — Harvest IP Law LLP

(57) ABSTRACT

A rotor and a turbo machine including the same are provided. The rotor includes a disk including a disk slot, a blade including a root member inserted into the disk slot and an airfoil disposed radially outside the root member, and configured to form a cooling cavity between an inner surface of the disk slot and the root member, a lifting part installed in the cooling cavity and configured to press the root member in a radially outward direction, and a supporting part installed in the cooling cavity, disposed in contact with the lifting part, and configured to support the lifting part.

8 Claims, 5 Drawing Sheets

(56) References Cited

U.S. PATENT DOCUMENTS

| | | | | |
|---|---|---|---|---|
| 4,820,127 | A * | 4/1989 | Cohen | F01D 5/30 416/221 |
| 5,123,813 | A * | 6/1992 | Przytulski | F01D 5/323 403/372 |
| 5,236,309 | A * | 8/1993 | Van Heusden | F01D 5/323 416/221 |
| 5,584,659 | A * | 12/1996 | Schmidt | F01D 5/323 416/221 |
| 6,332,617 | B1 * | 12/2001 | Leveaux | F01D 5/3038 277/637 |
| 6,447,253 | B2 * | 9/2002 | Tempere | G01N 33/225 416/221 |
| 6,464,463 | B2 * | 10/2002 | Yvon Goga | F01D 5/32 416/220 R |
| 6,736,602 | B2 * | 5/2004 | Carney | F01D 5/26 416/220 R |
| 6,761,538 | B2 * | 7/2004 | Fitts | F01D 5/3038 416/221 |
| 7,108,484 | B2 * | 9/2006 | Thenaisie | F04D 29/322 416/500 |
| 7,198,463 | B2 * | 4/2007 | Kanebako | F01D 5/3007 416/500 |
| 7,334,996 | B2 * | 2/2008 | Corbin | F01D 5/3007 416/221 |
| 8,186,961 | B2 * | 5/2012 | Stone | F01D 5/326 416/221 |
| 8,529,209 | B2 * | 9/2013 | Belmonte | F04D 29/668 416/221 |
| 8,616,850 | B2 * | 12/2013 | Ward | F01D 5/323 416/500 |
| 8,662,852 | B2 * | 3/2014 | Bhokardole | F01D 5/3023 416/222 |
| 8,764,402 | B2 * | 7/2014 | Agaram | F01D 5/3007 416/220 R |
| 8,851,854 | B2 * | 10/2014 | Alexander | F01D 5/323 416/500 |
| 8,870,545 | B2 * | 10/2014 | Reghezza | F01D 5/3007 416/220 R |
| 9,163,513 | B2 * | 10/2015 | Bestwick | F01D 5/3038 |
| 9,689,271 | B2 * | 6/2017 | Chatenet | B23P 15/006 |
| 9,909,431 | B2 * | 3/2018 | Polyzopoulos | F01D 5/323 |
| 10,408,068 | B2 * | 9/2019 | Whitehurst | F01D 5/141 |
| 10,465,537 | B2 * | 11/2019 | Burdgick | F01D 5/323 |
| 10,487,674 | B2 * | 11/2019 | Rehnsch | F01D 5/323 |
| 10,982,557 | B2 * | 4/2021 | Burdgick | F01D 5/326 |
| 2004/0076523 | A1 * | 4/2004 | Sinha | F01D 5/3007 29/889.21 |
| 2005/0207892 | A1 * | 9/2005 | Kanebako | F01D 5/081 416/219 R |
| 2006/0165530 | A1 * | 7/2006 | Corbin | F04D 29/322 416/220 R |
| 2010/0189564 | A1 * | 7/2010 | Stone | F01D 5/3092 29/889 |
| 2013/0156591 | A1 * | 6/2013 | Alexander | F01D 5/3092 416/221 |
| 2016/0040541 | A1 * | 2/2016 | Cosby | F01D 5/3053 416/219 R |
| 2017/0191493 | A1 * | 7/2017 | Kray | F04D 29/324 |
| 2017/0218776 | A1 * | 8/2017 | Thistle | F01D 5/3007 |
| 2017/0306771 | A1 * | 10/2017 | Weinert | F01D 5/326 |
| 2018/0135414 | A1 * | 5/2018 | Koda | F01D 5/3007 |
| 2021/0246790 | A1 * | 8/2021 | McCaffrey | F01D 5/10 |

* cited by examiner

ROTOR AND TURBO MACHINE INCLUDING SAME

CROSS REFERENCE TO RELATED APPLICATION

This application claims priority to Korean Patent Application No. 10-2020-0114789, filed on Sep. 8, 2020, the disclosure of which is incorporated herein by reference in its entirety.

BACKGROUND

1. Field

Apparatuses and methods consistent with exemplary embodiments relate to a rotor and a turbo machine including the same, and more particularly, to a rotor generating a driving force for power generation and a turbo machine including the same.

2. Description of the Related Art

A turbo machine refers to a device that generates a driving force used to generate electric power using fluid (e.g., gas) passing through the turbo machine. Therefore, a turbo machine and a generator are usually installed and used together. Examples of the turbo machine include gas turbines, steam turbines, and wind power turbines. A gas turbine mixes compressed air and gas and burns the mixture to generate combustion gas that is used to generate a driving force for generation of electric power. A steam turbine heats water to generate steam that is used to generate a driving force for generation of electric power. A wind turbine converts wind power into a driving force for generation of electric power.

The gas turbine includes a compressor section, a combustor section, and a turbine section. The compressor section includes compressor vanes and compressor blades that are alternately arranged in a compressor casing with an air inlet through which air is introduced. The introduced air is compressed by the compressor vanes and the compressor blades while passing through an inside of the compressor section. The combustor section supplies fuel to the compressed air compressed by the compressor section and ignites the fuel-air mixture with an igniter to generate a high temperature and high-pressure combustion gas. The combustion gas is supplied to the turbine section. The turbine section includes a plurality of turbine vanes and a plurality of turbine blades that are alternately arranged in a turbine casing. The combustion gas introduced into the turbine casing rotates the turbine blades while passing through an inside of the turbine casing and then flows out of the turbine casing through a turbine diffuser.

The steam turbine includes an evaporator and a turbine. The evaporator generates steam by heating water that is externally supplied. The turbine of the steam turbine includes a plurality of turbine vanes and a plurality of turbine blades that are alternately arranged in a turbine casing. While the gas turbine uses the combustion gas, the steam turbine uses the steam generated by the evaporator as a driving force source for rotating the turbine blades.

For example, the turbine includes a turbine disk and a plurality of turbine blades at each stage. The turbine disk is formed in a disk shape and has a plurality of turbine disk slots that are formed on an outer surface of the turbine disk and arranged in a circumferential direction of the turbine disk. The turbine blades are installed to be engaged with respective turbine disk slots. Each turbine blade includes a root member, a platform member, and an airfoil. The root member is inserted into the turbine disk slot. The platform is coupled to an outer end of the root member in a radial direction of the turbine disk. The airfoil is coupled to an outer surface of the platform in the radial direction of the turbine disk and is rotated by a stream of working fluid (i.e., combustion gas or steam). The turbine disk slot has a curved (e.g., fir-tree shaped) inner surface, and the root member has a curved outer surface corresponding to the contour of the inner surface of the turbine disk slot.

When the root member of each turbine blade is inserted into a corresponding one of the turbine disk slots, there a clearance exists between the surface of the root member and the surface of the turbine disk slot. This clearance facilitates the work of assembling the root member and the turbine disk, and is designed to accommodate the thermal expansion of each component during operation of the turbo machine.

During the operation of a turbo machine, each blade comes into close contact with the disk due to strong centrifugal force, preventing the blade from moving in the turbine disk slot. However, during a period when the turbo machine is stopped, the rotor rotates at a low speed and the centrifugal force applied to the blades weakens. Therefore, during this period, the gap between the blade and the disk within the turbine disk slot increases, resulting in a relative movement between the blade and the disk. Therefore, to prevent the relative movement between the blade and the disk, the turbo machine includes an adhesion structure that brings the blade and the disk into close contact. The adhesion structure includes a root spring mounted between the blade and the disk. When the rotor rotates at a low speed, a load is temporarily applied to the root spring, which deforms the root spring. This can damage the root spring.

SUMMARY

Aspects of one or more exemplary embodiments provide a rotor capable of brining a blade and a disk into tight contact with each other during operation of a turbo machine and reducing a load to a root spring, and a turbo machine including the same.

Additional aspects will be set forth in part in the description which follows and, in part, will become apparent from the description, or may be learned by practice of the exemplary embodiments.

According to an aspect of an exemplary embodiment, there is provided a rotor including: a disk including a disk slot; a blade including a root member inserted into the disk slot and an airfoil disposed radially outside the root member, and configured to form a cooling cavity between an end of the disk slot and an the root member; a lifting part installed in the cooling cavity and configured to press the root member radially outward; and a supporting part installed in the cooling cavity, disposed in contact with the lifting part, and configured to support the lifting part.

According to an aspect of another exemplary embodiment, there is provided a turbo machine including: a stator configured to guide fluid flowing through an inside thereof; and a rotor installed in the stator and rotated by the fluid flowing through the inside of the stator. The rotor includes: a disk including a disk slot; a blade including a root member inserted into the disk slot and an airfoil disposed radially outside the root member, and configured to form a cooling cavity between an inner end of the disk slot and an end of the root member in a radial direction; a lifting part installed in the cooling cavity and configured to press the root member radially outward; and a supporting part installed in the lifting part and configured to support the lifting part.

The lifting part may include: a contact portion in contact with the radially inner portion of the root member; and a pair of extensions extending radially inward from the contact portion and spaced apart from each other in a circumferential direction of the disk. The supporting part may be disposed between the pair of extensions.

The lifting part may further include a pair of bending portions extending radially inward from the pair of extensions and having a spacing therebetween which may decrease as they deepen in a radially inward direction, and the supporting part may be disposed radially outward of the pair of bending portions.

The supporting part may include an outer support portion in contact with a radially inner side of the contact portion, an inner support portion disposed radially inward of the outer support portion and seated radially outwardly of the pair of bending portions, and a connection support portion configured to connect the outer support portion and the inner support portion.

The connection support portion may have a width smaller in a circumferential direction than the outer support portion and the inner support portion.

The inner support portion may have a chamfered surface formed at a portion thereof in contact with the pair of bending portions.

The lifting part may include a contact portion in contact with a radially inner portion of the cooling cavity and a pair of extensions extending radially outward from the contact portion and spaced apart from each other in a circumferential direction of the disk. The supporting part may include a pair of supporting parts that are spaced apart from each other in the circumferential direction with the lifting part interposed therebetween. The supporting parts may be disposed between the pair of extensions and an inner wall of the disk slot.

The lifting part may further include a pair of bending portions each extending from a radially outer end of a corresponding one of the pair of extensions in a manner to approach each other, and each disposed in contact with the radially inner portion of the root member.

The pair of extensions may include a pair of first extensions each extending radially outward from the contact portion and a pair of second extensions each extending radially outward from a corresponding one of the pair of first extensions and increasingly spaced from the other as it goes radially outwardly. The supporting part may include a first curved surface in contact with the first extension and a second curved surface disposed radially outside the first curved surface, disposed in contact with the second extension, and having a larger curvature than that of the first curved surface.

The pair of supporting parts may extend radially outward to increasingly spaced apart from each other.

According to one or more exemplary embodiments, the rotor includes the lifting part installed in the disk slot and the supporting part installed in the lifting part to support the lifting part. The lifting part makes the blade and the disk come in tight contact with each other, and the supporting part absorbs a load applied to the lifting part due to a low speed rotation of the rotor. Therefore, it is possible to prevent the lifting part from being deformed or damaged.

BRIEF DESCRIPTION OF THE DRAWINGS

The above and other aspects will be more apparent from the following description of the exemplary embodiments with reference to the accompanying drawings, in which.

DETAILED DESCRIPTION

Figure 1:
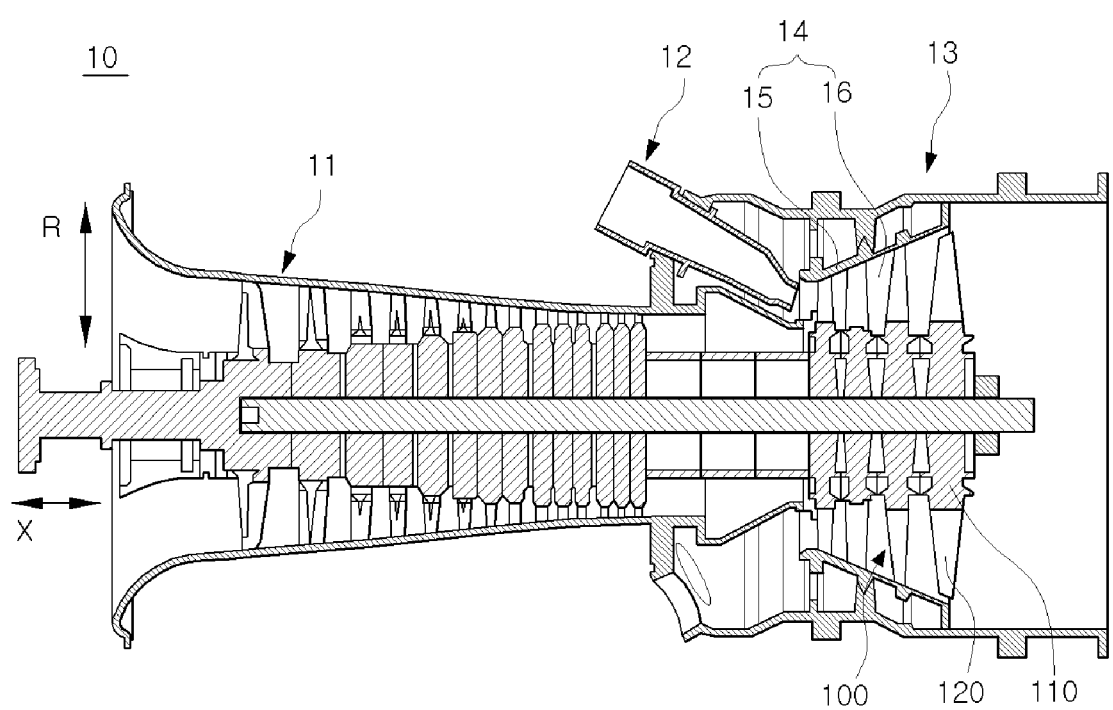
FIG. 1 is a cross-sectional view illustrating a schematic structure of a gas turbine according to an exemplary embodiment.

Various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein.

Terms such as "first," "second," and so on may be used to describe a variety of components, but the components should not be limited by these terms. These terms may be merely used to distinguish one component from other components. The use of such ordinal numbers should not be construed as limiting the meaning of the term. For example, the components associated with such an ordinal number should not be limited in the order of use, placement order, or the like. If necessary, each ordinal number may be used interchangeably.

Hereinafter, a rotor and a turbo machine including the rotor according to exemplary embodiments will be described in detail with reference to the accompanying drawings. In order to clearly illustrate the disclosure in the drawings, some of the elements that are not essential to the complete understanding of the disclosure may be omitted, and like reference numerals refer to like elements throughout the specification.

FIG. 1 is a cross-sectional view illustrating a schematic structure of a gas turbine according to an exemplary embodiment. Referring to FIG. 1, a gas turbine 10 includes a compressor 11, a combustor 12, and a turbine 13. In a flow direction of gas (e.g., compressed air or combustion gas) in the gas turbine 10, the compressor 11 is disposed at an upstream side and the turbine 13 is disposed at a downstream side. The combustor 12 is disposed between the compressor 11 and the turbine 13.

The compressor 11 includes compressor vanes and compressor rotors including a compressor disk and compressor blades in a compressor casing. The turbine 13 includes turbine vanes 16 and turbine rotors 100 including a turbine disk and turbine blades in a turbine casing 15. The compressor vanes and the compressor rotors are arranged in multiple stages along the direction of flow of compressed air, and the turbine vanes 16 and the turbine rotors 100 are also arranged in multiple stages along the direction of flow of combustion gas. The compressor 11 has an internal space of which volume decreases from a front stage to a rear stage thereof so that the introduced air can be compressed while passing through the inside of the compressor 11. On the contrary, the turbine 13 has an internal space of which volume increases from a front stage to a rear stage thereof so that the introduced combustion gas can expand while passing through the inside of the turbine 13.

In addition, a torque tube serving as a torque transmission member is disposed between the last-stage compressor rotor and the first-stage turbine rotor to transfer rotational torque generated by the turbine 13 to the compressor 11. Although the torque tube may include a plurality of torque tube disks arranged in three stages as illustrated in FIG. 1, this is only an example, and the torque tube may include a plurality of torque tube disks arranged in four or more stages or two or fewer stages.

The compressor rotor includes a compressor disk and a plurality of compressor blades. A plurality of compressor disks may be disposed in the compressor casing, and each of the plurality of compressor disks is fastened by a tie road so as not to be separated from each other in an axial direction. That is, the compressor disks are arranged in the axial direction with the tie rod extending through centers thereof. In addition, adjacent compressor rotor disks are arranged such that opposing surfaces of the compressor disks adjacent to each other are pressed against each other by the tie rod so that the compressor disks cannot rotate relative to each other.

The plurality of compressor blades are radially coupled to an outer surface of each of the compressor disks and arranged in a circumferential direction of the compressor disk. For each compressor stage, the plurality of compressor vanes are arranged on an inner surface of the compressor casing in the circumferential direction to form an overall annular shape and are alternately arranged with the plurality of compressor blades. While the compressor rotor disks rotate along with a rotation of the tie rod 4, the compressor vanes fixed to the compressor casing do not rotate. The compressor vanes align the flow of compressed air passing through the compressor blades and guide the flow of the compressed air moved from front-stage compressor blades to rear-stage compressor blades. Here, the compressor casing and the compressor vanes may be defined as a compressor stator to distinguish them from the compressor rotor.

The tie rod is installed to extend through the centers of the plurality of compressor disks and the plurality of turbine disks, such that one end thereof is fastened to the compressor disk located on a foremost end side of the compressor and the other end is fastened by a fixing nut.

Because the tie rod may be formed in various structures according to a type of a gas turbine, a shape of the tie rod is not limited to the example illustrated in FIG. 1. There are three types of tie rods: a single-type in which a single tie rod extends through the centers of the compressor disks and the turbine rotor disks; a multi-type in which multiple tie rods are arranged in a circumferential direction; and a complex type in which the single-type and the multi-type are combined.

Also, the compressor may include a deswirler serving as a guide blade. The deswirler increases the pressure of fluid flowing into the combustor and adjusts the flow angle of the fluid to be substantially equal to the designed flow angle.

The combustor 12 mixes the introduced compressed air with fuel and burns the air-fuel mixture to produce high-temperature and high-pressure combustion gas, thereby raising the temperature of the combustion gas to a heat-resistant temperature at which the components of the combustor and the components of turbine can endure through an isothermal combustion process.

A plurality of combustors constituting the combustor 12 are provided in a form of a cell in a combustor casing. Each combustor includes a nozzle for injecting fuel, a liner defining a combustion chamber, and a transition piece serving as a connector between the combustor and the turbine.

The liner defines the combustion chamber in which the fuel injected through the fuel injection nozzle and the compressed air fed from the compressor are mixed and burned. That is, the liner includes a combustion chamber that provides combustion space in which the fuel-air mixture is combusted, and a liner annular flow passage that surrounds the combustion chamber to provide an annular space. The nozzle for injecting fuel is installed at a front end of the liner, and an igniter is installed in a wall of the liner.

In the liner annular flow passage, compressed air introduced through a plurality of holes formed in an outer wall of the liner flows, and the introduced compressed air cools the liner while flowing toward the transition piece. Because the compressed air flows along the outer surface of the liner, it is possible to prevent the liner from being thermally damaged by high temperature combustion gas.

The transition piece is coupled to a rear end (i.e., downstream end) of the liner to deliver the combustion gas toward the turbine. The transition piece has a transition piece annular flow passage surrounding an internal space of the transition piece. As the compressed air flows along the annular flow passage, an outer surface of the transition piece is cooled by the compressed air to prevent thermal damage by the high temperature combustion gas.

The high-temperature and high-pressure combustion gas supplied to the turbine 13 expands while passing through the inside of the turbine 13. The expansion of the combustion gas causes impulse and reaction forces with respect to the turbine blades 120, thereby generating torque. The torque is transferred to the compressor through the torque tube, and an excessive portion of the torque exceeding the power required to driving the compressor is used to drive a generator or the like.

The turbine 13 is similar in structure to the compressor 11. That is, the turbine 13 includes a plurality of turbine rotors 100 similar to the compressor rotors of the compressor 11. Each turbine rotor 100 includes a turbine disk 110 and a plurality of turbine blades 120 radially coupled to the outer surface of the turbine disk 110. The turbine disk 110 and the plurality of turbine blades 120 are designed in a structure in which they are arranged in a multi-stage to be spaced apart from each other along a flow direction of the combustion gas. A plurality of turbine vanes 16 are radially coupled to the inner surface of the turbine casing 15 along the circumferential direction such that each stage of turbine vanes 16 is disposed between adjacent stages of turbine blades 120 to guide a flow of the combustion gas passing through the turbine blades 120. Here, the turbine casing 15 and the turbine vanes 16 may be defined as a turbine stator 14 to distinguish them from the turbine rotor 100.

Figure 2:
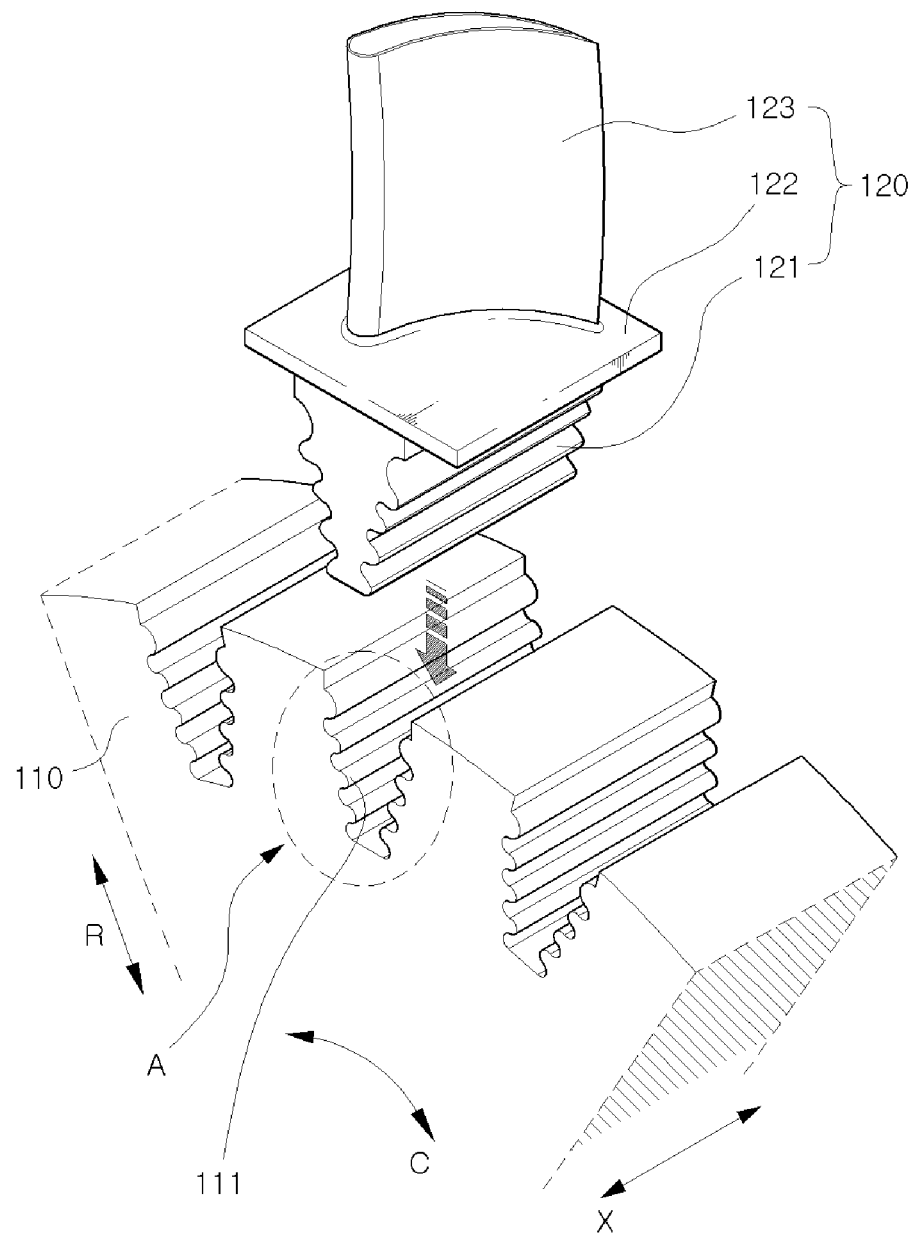
FIG. 2 is a perspective view illustrating a turbine rotor according to an exemplary embodiment.

FIG. 2 is a perspective view illustrating a turbine rotor 100 according to an exemplary embodiment. Referring to FIG. 2, the turbine disk 110 has a plurality of turbine disk slots 111 arranged on the outer surface along a circumferential direction of the turbine disk 110. The turbine disk 110 has a circular disk shape. The turbine blades 120 are installed on the radially outer surface of the turbine disk 110. Each turbine blade 120 includes a root member 121 inserted into the turbine disk slot 111, a platform 122 coupled to the radially outer surface of the root member 121, and an airfoil 123 that is coupled to the radially outer surface of the platform 122 and is rotated by the combustion gas.

The platform 122 couples the airfoil 123 to the root member 121. The platforms 122 is configured such that a side surface thereof is in contact with an adjacent platform 122 to maintain a spacing between adjacent turbine blades 120. FIG. 2 illustrates a case in which the platform 122 has a planar shape, but it is understood that this is only an example, and other exemplary embodiments are not limited thereto.

The root member 121 coupled to each of the turbine disk slots 111 provided on a lower surface of the platform 122. The root member 121 has a shape corresponding to a shape of curved contour of the turbine disk slot 111, which varies according to the type of a commercial gas turbine 10. The dovetail type or the fir tree type are mainly used.

Examples of a coupling method of the root member 121 includes a tangential type in which the root member 121 is inserted into the turbine disk slot 111 in a tangential direction to the outer circumferential surface of the turbine disk 110 and an axial type in which the root member 121 is inserted into the turbine disk slot 111 in an axial direction of the turbine disk. Alternatively, the turbine blades 120 may be fastened to the turbine disk 110 using coupling means other than such types, such as keys or bolts.

The airfoil 123 is formed on an upper surface of the platform 122. The airfoil 123 has a profile optimized according to specifications of the gas turbine 10 and includes a leading edge disposed at an upstream side based on the flow direction of combustion gas and a trailing edge disposed at a downstream side.

Unlike the compressor blades, the turbine blades 120 comes into direct contact with high-temperature and high-pressure combustion gas. Because the combustion gas has a high temperature of about 1700° C., a cooling means is required. To this end, the gas turbine 10 has bleeding passages through which the compressed air extracted from some portions of the compressor is supplied to the turbine blades 120.

The bleeding passage may be an external passage that is formed outside the turbine casing, an internal passage that is formed to extend through the turbine rotor disk, or a combined passage composed of the external passage and the internal passage. A plurality of film cooling holes are formed in the surface of the airfoil 123. The film cooling holes are in communication with cooling passages formed in the airfoil 123 to serve to feed compressed air to the surface of the airfoil 123.

Here, reference character C denotes a circumferential direction of the turbine disk 110, reference character R denotes a radial direction of the turbine disk 110, and reference character X denotes an axial direction serving as a rotation center of the turbine disk 110. Further, reference character X also denotes a longitudinal direction of the tie rod illustrated in FIG. 1.

Figure 3:
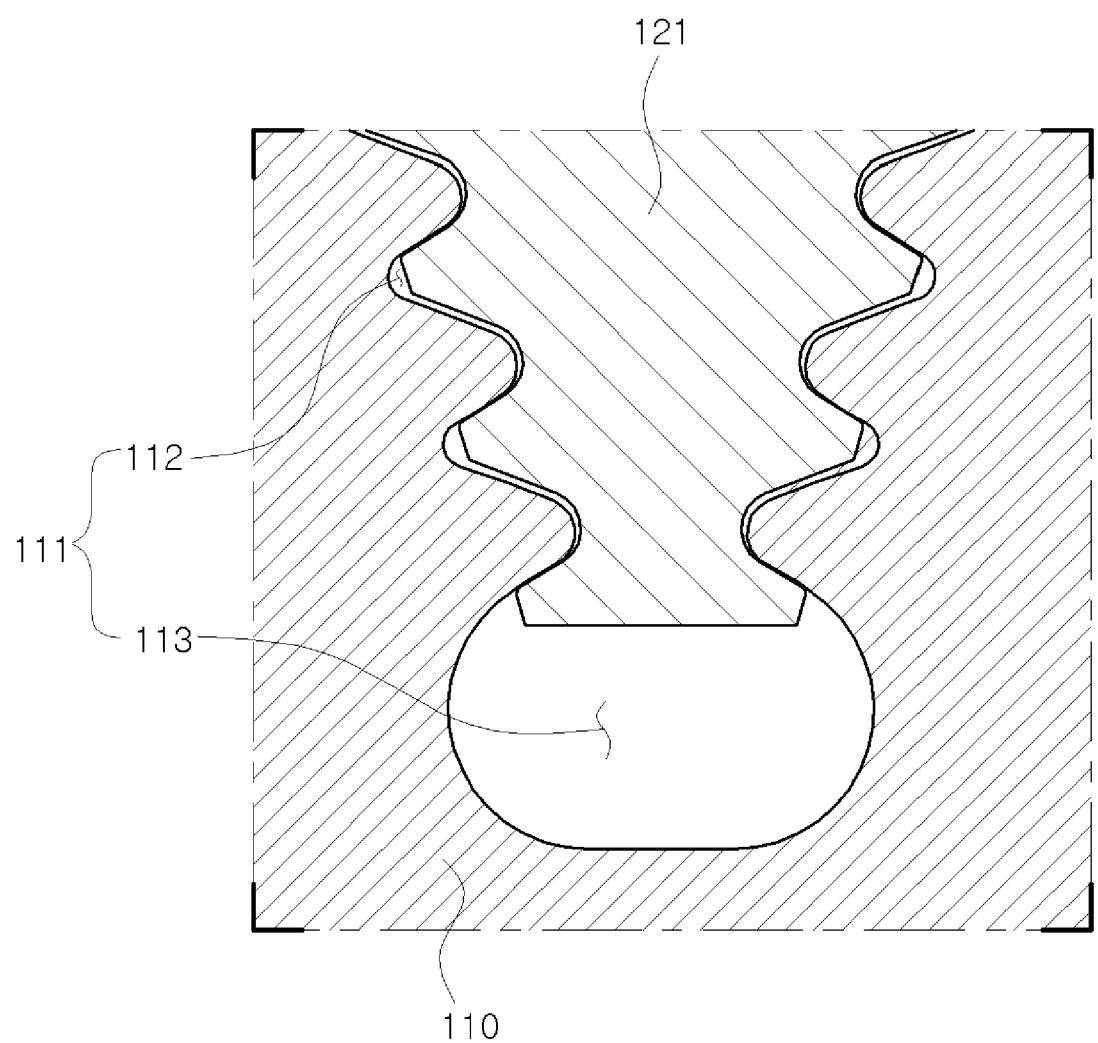
FIG. 3 is a front view illustrating a portion denoted by character "A" of FIG. 2, in which a root member is inserted in a disk slot.

FIG. 3 is a front view illustrating a portion denoted by character "A" of FIG. 2, in which a root member is inserted in a disk slot. Referring to FIG. 3, the turbine disk slot 111 includes a curved cavity 112 and a cooling cavity 113. The curved cavity 112 is a portion to accommodate the root member 121 of the turbine blade 120 and has a dovetail-shaped or fir-tree-shaped inner wall. The cooling cavity 113 is disposed inside the curved cavity 112 in the radial direction R, and cooling air such as compressed air extracted from the compressor 11 is supplied to the cooling cavity 113.

The root member 121 is inserted into the curved cavity 112 of the turbine disk slot 111. A supply hole through which cooling air is supplied is formed at a radially inner end of the root member 121. The cooling cavity 113 is formed between the radially inner end of the root member 121 and a radially inner end of the turbine disk slot 111. The cooling air introduced into the turbine disk slot 111 through the cooling cavity 113 flows into the turbine blade 120 through the supply hole to cool the turbine blade 120 while circulating the turbine blade 120.

Figure 4:
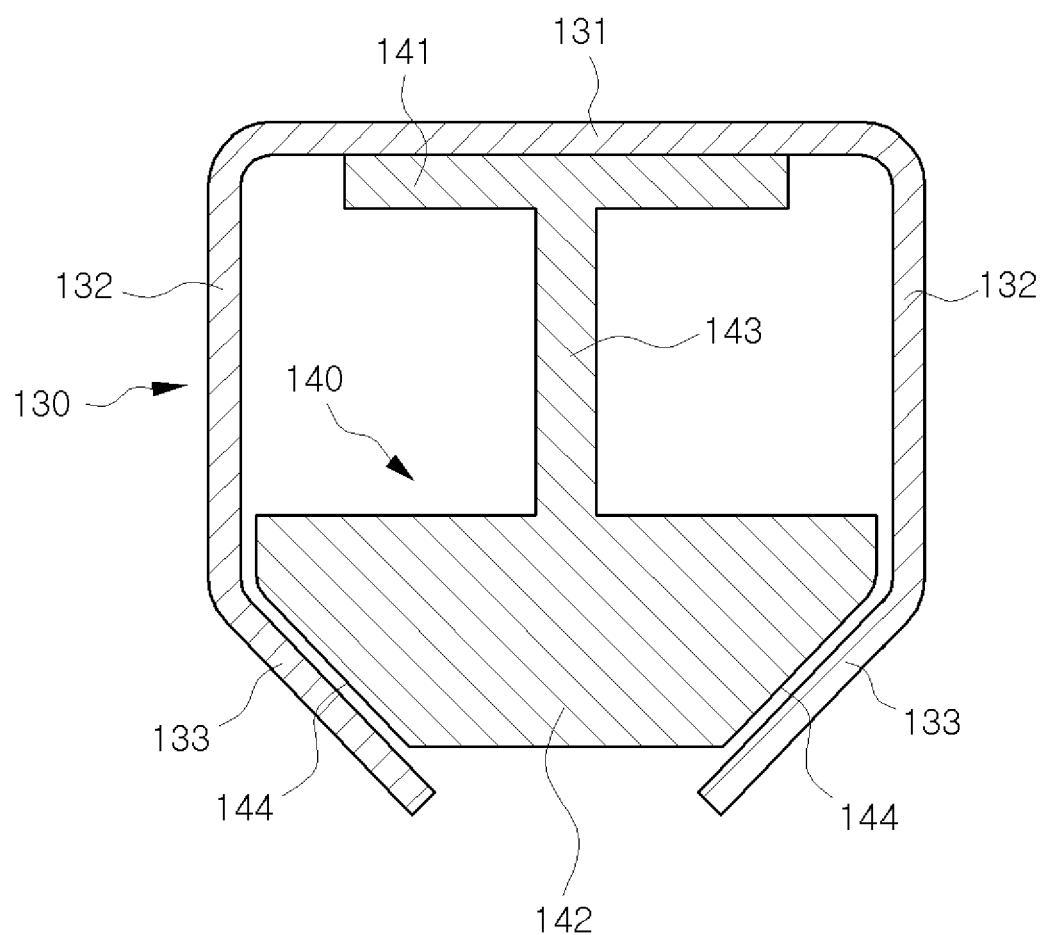
FIG. 4 is a front view of a lifting part and a supporting part according to a first exemplary embodiment.
Figure 5:
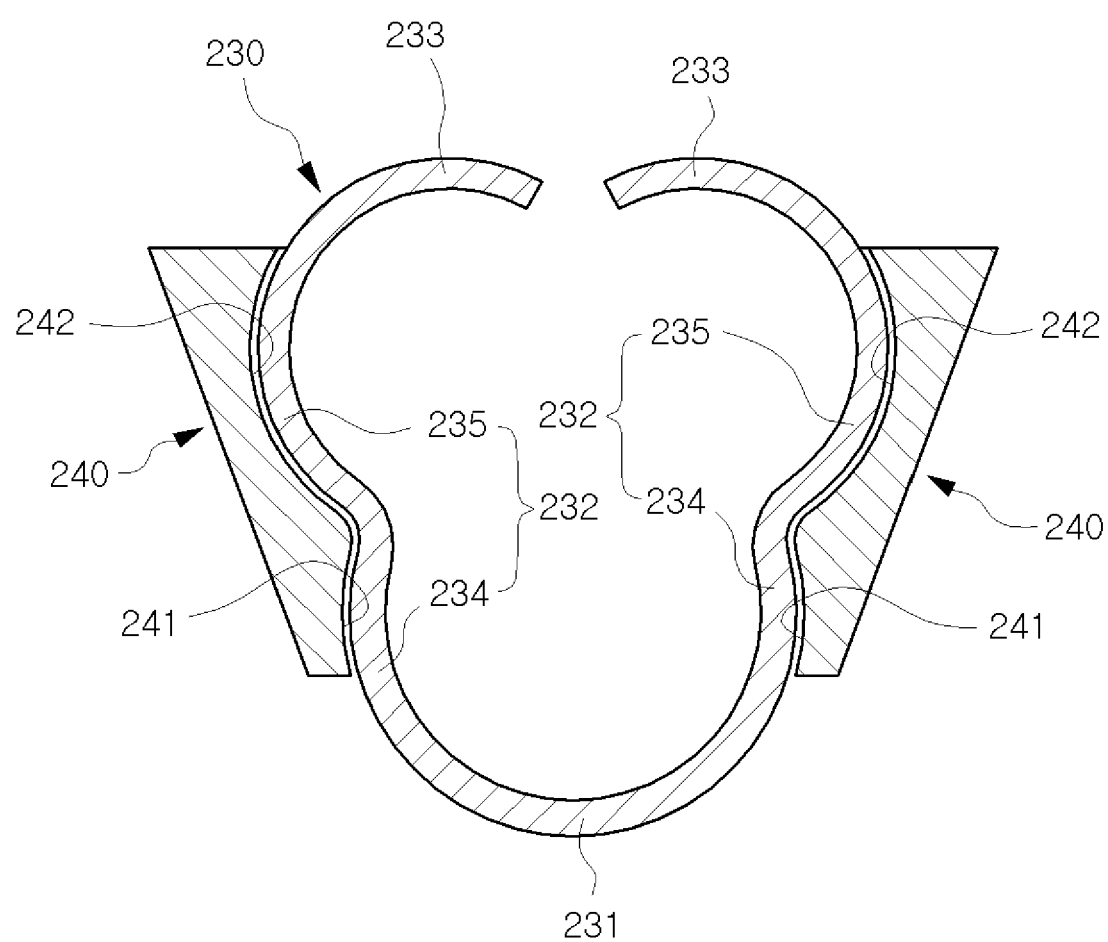
FIG. 5 is a front view of a lifting part and a supporting part according to a second exemplary embodiment.

FIG. 4 is a front view of a lifting part and a supporting part according to a first exemplary embodiment. FIG. 5 is a front view of a lifting part and a supporting part according to a second exemplary embodiment.

Referring to FIGS. 4 to 5, the turbine rotor 100 further includes a lifting part 130 (or 230) and a supporting part 140 (or 240). The lifting part 130 (or 230) is installed in the cooling cavity 113 to push the root member 121 radially outward. The supporting part 140 (or 240) is installed in the cooling cavity 113, is disposed in contact with the lifting part 130 (or 230), and is configured to support the lifting part 130 (or 230). Therefore, the turbine blade 120 and the turbine disk 110 are in close contact with each other by the lifting part 130 (or 230), and a load applied to the lifting part 130 (or 230) due to certain regions including low rotation speed of the rotor 100 is absorbed by the supporting part 140 (or 240). Therefore, it is possible to prevent the lifting part 130 (or 230) from being deformed or damaged.

Referring to FIG. 4, the lifting part 130 includes a contact portion 131, a pair of extensions 132, and a pair of bending portions 133. The supporting part 140 includes an outer support portion 141, an inner support portion 142, and a connection support portion 143.

The contact portion 131 extends along the circumferential direction C and is in contact with the radially inner end of the root member 121. Each of the pair of extensions 132 extends in a radially inward direction from the contact portion 131 and is spaced apart from each other in the circumferential direction C. The bending portions 133 obliquely extend in the radially inward direction from the respective extensions 132 and are seated in the cooling cavity 133. In addition, the bending portions 133 are configured to extend obliquely from the respective extensions 132 such that a distance between the bending portions 133 may decrease as the bending portions 133 deepen radially inward.

The supporting part 140 is disposed between the extensions 132 and between the contact portion 131 and the pair of bending portions 133. The outer support portion 141 is installed on an inner side of the contact portion 131. The inner support portion 142 is seated on an inner side of the pair of bending portions 133. In this case, the inner support portion 142 has chamfered surfaces 144 facing the respective bending portions 133. The connection support portion 143 connects the outer support portion 141 and the inner support portion 142 to each other. The connection support portion 143 has a smaller width in the circumferential direction C than the outer support portion 141 and the inner support portion 142.

When the supporting part 140 is designed in this shape, the supporting part 140 can support the lifting part 130 inside the lifting part 130 and the cooling air can be supplied through gap between the supporting part 140 and the lifting part 130. In addition, according to the first exemplary embodiment, when the turbine rotor 100 rotates at a low speed so that a load is instantaneously applied to the lifting part 130 by the turbine blade 120, the supporting part 140 can absorb the load to prevent the lifting part 130 from being excessively deformed or damaged.

Referring to FIG. 5, the lifting part 230 includes a contact portion 231, a pair of extensions 232, and a pair of bending portions 233. A pair of supporting parts 240 are spaced apart from each other in the circumferential direction C, and the lifting part 230 is disposed therebetween.

The contact portion 231 is disposed to contact a radially inner portion of the cooling cavity 113. The pair of extensions 232 extend outwardly from the contact portion 231 in the radial direction R and are disposed to be spaced apart from each other in the circumferential direction C. In this case, the pair of extensions 232 include a pair of first extensions 234 and a pair of second extensions 235. The first extensions 234 extend outwardly from the contact portion 231. The second extensions 235 extend outwardly from the respective first extensions 234 and are formed in a shape that a distance between the second extensions 235 becomes wider as they go outward in the radial direction. The bending portions 233 are bent toward each other and extend to approach each other from an outer end of the respective second extensions 235 in the radial direction R. In addition, the bending portions 233 are in contact with the radial inner end of the root member 121.

Here, the contact portion 231 is plate-shaped and convex inwardly in the radial direction R, each of the pair of second extensions 235 is plate-shaped and convex outwardly in the circumferential direction C, and each of the pair of bending portions 233 is plate-shaped and convex outwardly in the radial direction R. However, the shapes of those elements are not limited thereto.

The pair of supporting parts 240 are spaced apart from each other in the circumferential direction C with the lifting part 230 interposed therebetween and are disposed between the pair of extensions 232 and an inner wall of the cooling cavity 113. Each of the pair of supporting parts 240 has a first curved surface 241 and a second curved surface 242 at positions facing the lifting part 230. The first curved surface 241 is disposed to be in contact with the first extension 234. The second curved surface 242 is disposed outside the first curved surface 241 in the radial direction R, is in contact with the second extension 235, and has a curvature greater than that of the first curved surface 241. The pair of supporting parts 240 extend to be more spaced from each other toward outward in the radial direction.

Because the lifting part 230 in the second exemplary embodiment of FIG. 5 receives a force in the opposite direction to the lifting part 130 in the first exemplary embodiment of FIG. 4, the supporting part 240 in the second exemplary embodiment is not installed inside the lifting part 230 but is installed between the lifting part 230 and the inner wall of the cooling cavity 113.

When the supporting part 240 is configured as described above, the lifting part 230 can bring the turbine blade 120 into close contact with the turbine disk 110 and allow the cooling air to be introduced through the inner space of the lifting part 230. In addition, according to the second exemplary embodiment, when the turbine rotor 100 rotates at a low speed so that a load is instantaneously applied to the lifting part 230 by the turbine blade 120, the supporting part 240 can absorb the load to prevent the lifting part 230 from being excessively deformed or damaged.

While exemplary embodiments have been described with reference to the accompanying drawings, it will be apparent to those skilled in the art that various modifications in form and details may be made therein without departing from the spirit and scope as defined in the appended claims. Therefore, the description of the exemplary embodiments should be construed in a descriptive sense and not to limit the scope of the claims, and many alternatives, modifications, and variations will be apparent to those skilled in the art.

What is claimed is:

1. A rotor comprising:
a disk including a disk slot;
a blade including a root member inserted into the disk slot and an airfoil disposed radially outside the root member, and configured to form a cooling cavity between an inner surface of the disk slot and the root member;
a lifting part installed in the cooling cavity and configured to press the root member in a radially outward direction; and
a supporting part installed in the cooling cavity, disposed in contact with the lifting part, and configured to support the lifting part,
wherein the lifting part comprises:
a contact portion in contact with a radially inner portion of the root member;
a pair of extensions extending radially inward from the contact portion and spaced apart from each other in a circumferential direction of the disk, and
a pair of bending portions extending radially inward from the pair of extensions and having a spacing therebetween which decreases as they deepen in a radially inward direction and configured to be capable of being bent toward each other while not meeting each other, and
wherein the supporting part is disposed between the pair of extensions and radially outward of the pair of bending portions.

2. The rotor according to claim 1, wherein the supporting part comprises: an outer support portion in contact with a radially inner side of the contact portion; an inner support portion disposed radially inward of the outer support portion and seated radially outwardly of the pair of bending portions; and a connection support portion configured to connect the outer support portion and the inner support portion.

3. The rotor according to claim 2, wherein the connection support portion has a smaller width in a circumferential direction than the outer support portion and the inner support portion.

4. The rotor according to claim 2, wherein the inner support portion has a chamfered surface at a position in contact with the bending portion.

5. A turbo machine comprising:
a stator configured to guide fluid flowing through an inside thereof; and
a rotor installed in the stator and rotated by the fluid flowing through the inside of the stator,
wherein the rotor comprises:
a disk including a disk slot;
a blade including a root member inserted into the disk slot and an airfoil disposed radially outside the root member, and configured to form a cooling cavity between an inner end of the disk slot and an end of the root member in a radial direction;
a lifting part installed in the cooling cavity and configured to push the root member radially outward; and
a supporting part installed in the lifting part and configured to support the lifting part
wherein the lifting part comprises:
a contact portion in contact with a radially inner portion of the root member;
a pair of extensions extending radially inward from the contact portion and spaced apart from each other in a circumferential direction of the disk, and
a pair of bending portions extending radially inward from the pair of extensions and having a spacing therebetween which decreases as they deepen in a radially inward direction and configured to be capable of being bent toward each other while not meeting each other, and wherein the supporting part is dispose between the pair of extensions and radially outward of the pair of bending portions.

6. The turbo machine according to claim 5, wherein the supporting part comprises: an outer support portion in contact with a radially inner side of the contact portion; an inner support portion disposed radially inward of the outer support portion and seated radially outwardly the pair of bending portions; and a connection support portion configured to connect the outer support portion and the inner support portion.

7. The turbo machine according to claim 6, wherein the connection support portion has a smaller width in a circumferential direction than the outer support portion and the inner support portion.

8. The turbo machine according to claim 6, wherein the inner support portion has a chamfered surface at a position in contact with the bending portion.

\* \* \* \* \*